(12) United States Patent
Bernstein et al.

(10) Patent No.: US 6,717,661 B1
(45) Date of Patent: Apr. 6, 2004

(54) FOURIER MOIRE WAVEFRONT SENSOR

(75) Inventors: Aaron C. Bernstein, Albuquerque, NM (US); Jean-Claude M. Diels, Albuquerque, NM (US)

(73) Assignee: Science & Technology Corporation @ University of New Mexico, Albuquerque, NM (US)

( * ) Notice: Subject to any disclaimer, the term of this patent is extended or adjusted under 35 U.S.C. 154(b) by 382 days.

(21) Appl. No.: 09/771,303

(22) Filed: Jan. 26, 2001

Related U.S. Application Data
(60) Provisional application No. 60/178,140, filed on Jan. 26, 2000.

(51) Int. Cl.[7] .................................................. G01J 1/00
(52) U.S. Cl. ........................ 356/121; 356/605; 356/618
(58) Field of Search .............................. 356/121, 618, 356/619, 605, 499; 250/237 G

(56) References Cited

U.S. PATENT DOCUMENTS

| | | | |
|---|---|---|---|
| 3,921,080 A | 11/1975 | Hardy | |
| 4,187,000 A | 2/1980 | Constant | |
| 4,351,589 A | 9/1982 | Chavel et al. | |
| 4,798,437 A | 1/1989 | Rediker et al. | |
| 4,872,135 A | 10/1989 | Peterson et al. | |
| 4,972,075 A * | 11/1990 | Hamada et al. | 250/201.5 |
| 5,042,950 A | 8/1991 | Salmon, Jr. | |
| 5,090,795 A | 2/1992 | O'Meara et al. | |
| 5,111,314 A | 5/1992 | Leib | |
| 5,159,474 A | 10/1992 | Franke et al. | |
| 5,192,982 A * | 3/1993 | Lapucci | 356/520 |
| 5,229,889 A | 7/1993 | Kittell | |
| 5,479,257 A | 12/1995 | Hashimoto | |
| 5,859,424 A * | 1/1999 | Norton et al. | 250/226 |
| 5,872,648 A | 2/1999 | Sanchez et al. | |
| 5,902,994 A * | 5/1999 | Lisson et al. | 250/208.1 |
| 5,936,720 A | 8/1999 | Neal et al. | |
| 6,130,419 A | 10/2000 | Neal | |
| 6,313,473 B1 * | 11/2001 | Lin et al. | 250/492.1 |

OTHER PUBLICATIONS

Canabai, H., et al., "Automatic Processing in Moire Deflectometry by Local Fringe Direction Calculation," *Applied Optics*, vol. 37, No. 25 pp 5894–5901 (Sep. 1998).

* cited by examiner

Primary Examiner—Russell Adams
Assistant Examiner—Michelle Nguyen
(74) Attorney, Agent, or Firm—Schwegman, Lundberg, Woessner & Kluth, P.A.

(57) ABSTRACT

An apparatus and method for wavefront sensing that includes: employing two moiré gratings in an optical path; optically Fourier transforming a moiré deflectogram produced by the gratings; variably transmitting the transformed moiré deflectogram; and receiving an image of the variably transmitted and transformed moiré deflectogram. The variable transmission is best accomplished by transmission filter, a transmissive optic encoding intensity information upon the moiré deflectogram as a function of fringe angle. For example, the function can be a triangular transmission function centered on the (0,0) order spatial frequency spot and oriented at 45 degrees to the y-axis. The optical Fourier transform is accomplished by a lens and the variable transmission by an apodized slit.

32 Claims, 8 Drawing Sheets

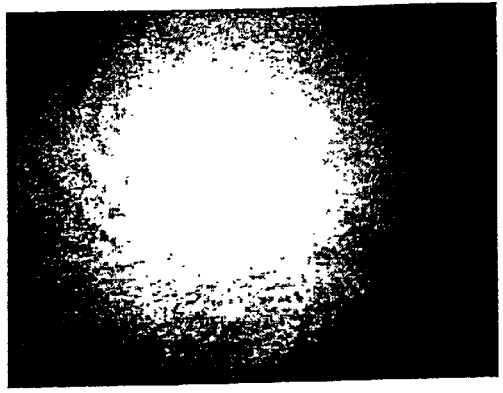

Moiré Deflectogram – *Air* Slit
- Camera does not resolve fringes.
- Imperfect gratings cause secondary fringes.

(a)

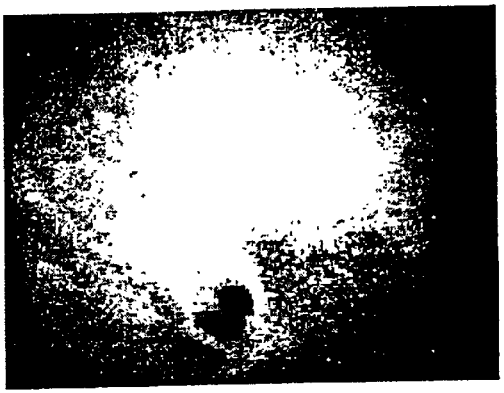

Moiré Deflectogram *Apodized* Slit
- Very different intensity pattern.

(b)

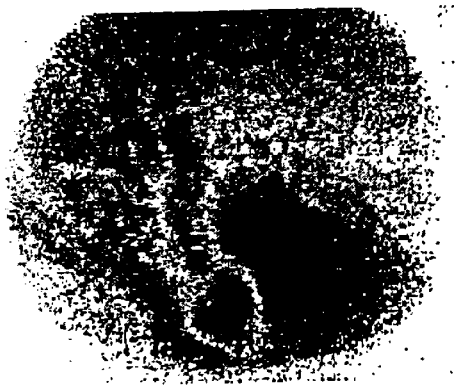

Normalized Pattern
- All fringe slope information across the profile has equal weighting.
- Proportional to $2^{nd}$ wavefront derivative.

(c)

Macroscopic Fringe Deflectogram for Comparison
- Typical deflectogram (camera resolves fringes)

Moire Deflectogram -- *Air* Slit
- Camera does not resolve fringes.
- Imperfect gratings cause secondary fringes.
(a)
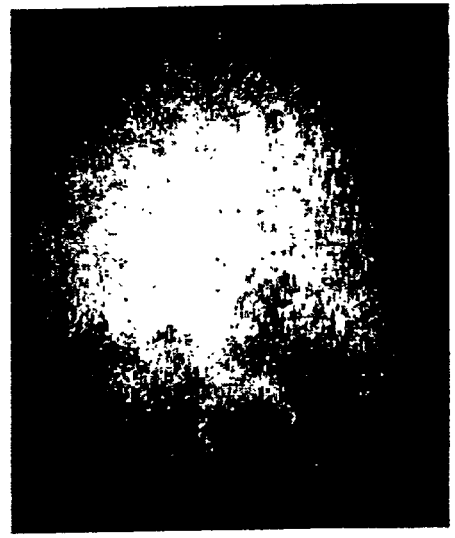
Moiré Deflectogram -- *Apodized* Slit
- Very different intensity pattern
- Looks like a 3D surface illuminated from the upper left.
(b)
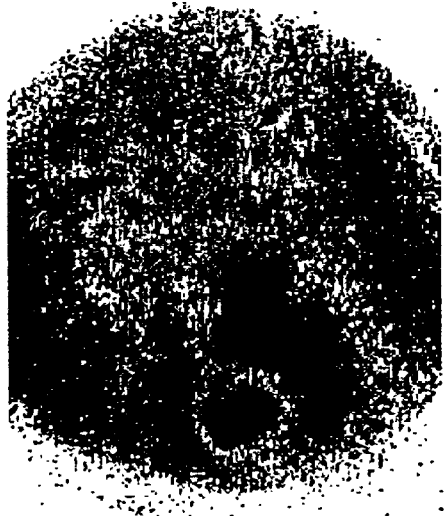
Normalized Pattern
- All fringe slope information across the profile has equal weighting.
(c)
Figure 9

FOURIER MOIRE WAVEFRONT SENSOR

CROSS-REFERENCE TO RELATED APPLICATIONS

This application claims the benefit of the filing of U.S. Provisional Patent Application Ser. No. 60/178,140, entitled "Automatic Optical Fourier Wavefront Sensor", filed on Jan. 26, 2000, and the specification thereof is incorporated herein by reference.

BACKGROUND OF THE INVENTION

1. Field of the Invention (Technical Field):

The present invention relates to optical wavefront sensors, to optical Fourier techniques, and to moiré deflectogram.

2. Background Art:

Typical analyses of moiré deflectograms include fringe recognition, computer Fourier transformations, and phase-shifting techniques, requiring multiple shots in order to get high resolution. Computer-based Fourier-transform and phase-shifting techniques are only with difficulty able to resolve and determine where fringes are, especially when fringes close into loops or branch.

Related wavefront sensor or Fourier transform technologies are disclosed in the following references: U.S. Pat. No. 6,130,419, to Neal, entitled "Fixed Mount Wavefront Sensor"; U.S. Pat. No. 5,936,720, to Neal et al., entitled "Beam Characterization by Wavefront Sensor"; U.S. Pat. No. 5,872,648, to Sanchez et al., entitled "On-Axis Spatial Light Modulators and Methods of Use"; U.S. Pat. No. 5,479,257, to Hashimoto, entitled "Method of and Apparatus for Detecting Object Position Using a Fourier Transform of the Object Image and Processing System Using the Same"; U.S. Pat. No. 5,229,889, to Kittell, entitled "Simple Adaptive Optical System"; U.S. Pat. No. 5,192,982, to Lapucci, entitled "Coded-Fringe Interferometric Method and Device for Wavefront Detection in Optics"; U.S. Pat. No. 5,159,474, to Franke et al., entitled "Transform Optical Processing System": U.S. Pat. No. 5,111,314, to Leib, entitled "Optical Correlator Interconnect for Optical Computer"; U.S. Pat. No. 5,090,795, to O'Meara et al., entitled "Integrated Adaptive optics Apparatus"; U.S. Pat. No. 5,042,950, to Salmon, Jr., entitled "Apparatus and Method for Laser Beam Diagnosis": U.S. Pat. No. 4,872,135, to Peterson et al., entitled "Double Pinhole Spatial Phase Correlator Apparatus"; U.S. Pat. No. 4,798,437, to Rediker et al., entitled "Method and Apparatus for Processing Analog Optical Wave Signals"; U.S. Pat. No. 4,351,589, to Chavel et al., entitled "Method and Apparatus for Optical Computing and Logic Processing by Mapping of Input Optical Intensity into Position of an Optical Image"; U.S. Pat. No. 4,187,000, to Constant, entitled "Addressable Optical Computer and Filter"; and U.S. Pat. No. 3,921,080, to Hardy, entitled "Analog Data Processor".

The present invention uses moiré deflectometry and the Fourier transforming properties of a lens to optically compute the wavefront curvature of incident light, and so computation takes place as fast and as simply as possible. Optical Fourier processing is automatically performed within the optical device, and so information is available literally at the speed of light. The deflectograms are obtained under a set of conditions whereby they do not have to be digitized, and the fringes do not have to be resolved by detection equipment. Hence, resolution is determined by pixel size, not fringe spacing or algorithm matrix size.

Prior techniques have certain advantages. For example, the Schlieren technique, discussed in E. Hecht, *Optics* (2d ed. 1987), gives the magnitude of wavefront distortion, but not the sense of curvature. Shack-Hartmann sensors (see, e.g., U.S. Pat. No. 5,936,720) are very popular for wavefront correction, but suffer from trade-offs between diffractive effects and sensitivity, dynamic range, and sensitive alignment issues.

However, the present invention overcomes the technical difficulties of previous techniques at a minimal cost. Devices of the invention can be housed much like camera lenses are, permitting parameters varying sensitivity and dynamic range, such as relative gratings angle and grating separation, to be easily adjusted and measured.

SUMMARY OF THE INVENTION
(DISCLOSURE OF THE INVENTION)

The present invention is of an apparatus and method for wavefront sensing comprising: employing two moiré gratings in an optical path; optically Fourier transforming a moiré deflectogram produced by the gratings; variably transmitting the transformed moiré deflectogram; and receiving an image of the variably transmitted and transformed moiré deflectogram. In the preferred embodiment, the variable transmission is accomplished by transmission filter, most preferably a transmissive optic encoding intensity information upon the moiré deflectogram as a function of fringe angle. For example, the function can be a triangular transmission function centered on the (0,0) order spatial frequency spot and oriented at 45 degrees to the y-axis. The optical Fourier transform is preferably accomplished by a lens and the variable transmission by an apodized slit.

The invention is also of a Fourier moiré generating apparatus and method for wavefront sensing comprising: employing two moiré gratings in an optical path: employing an optical Fourier transform means following the gratings in the optical path; and employing an apodized optical means following the lens in the optical path. In the preferred embodiment, the apodized optical means is an apodized slit encoding intensity information upon the moiré deflectogram as a function of fringe angle, and the transform means is a lens.

A primary object of the present invention is to provide for rapid, high-resolution, computer-free, quantitative, and inexpensive wavefront measurement.

A primary advantage of the present invention is that optical moiré and Fourier techniques are the main processing tools and so the device of the invention operates at the speed of light Another advantage of the present invention is that optical Fourier filtering transfers the useful information of the deflectogram (changes in fringe direction) directly to electrical signal. Certain types of morphable membrane mirrors for adaptive optics application can be driven directly from such data, obviating the need for computer-driven controls.

A further advantage is that the invention provides valuable advantages over prior wavefront detectors such as Shack-Hartmann sensors. These sensors are limited in their dynamic range because they rely on unambiguous pixel areas allocated to each lenslet in a lenslet array. To allow for unexpectedly large aberrations, the only choice is to retrofit a new lenslet array with larger lenses. The sensitivity of detection is adjustable by merely changing the distance between two gratings (ronchi rulings). This overcome another deficiency of the Shack Hartmann sensors in that these require expensive retrofitting to change sensitivity.

Yet another advantage is that the invention determines wavefront shape to a constant, i.e., the overall tilt of the wavefront remains ambiguous. Generally, this overall tilt is not considered important, as long as the shape of the wave is determined. Hence, in the present invention, the measurement is relatively Insensitive to the alignment of the beam into the device. However, tilt is precisely what is measured (not curvature) with the Shack-Hartmann device, and hence, beam alignment is a tricky issue. A beam which "wanders" is, then, most easily examined by the present invention.

Another advantage is that the invention has at least double the optical resolution of other moiré techniques because the pixel spacing of the camera determines the resolution whereas in other techniques, for computation of the data to be performed, fringes have to be resolved in the image. Because it requires two pixels to resolve a single fringe (invoking the Nyquist theorem), the increase in resolution is at least twofold.

Yet another advantage is that the invention is implementable in a very compact and low cost form.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present Invention and, together with the description, serve to explain the principles of the invention. The drawings are only for the purpose of illustrating a preferred embodiment of the invention and are not to be construed as limiting the invention. In the drawings:

FIG. 8(a) illustrates a moiré deflectogram using an air slit, in which the camera does not resolve fringes and imperfect gratings cause secondary fringes;

FIG. 8(b) is the moiré deflectogram with an apodized slit, showing a very different intensity pattern from FIG. 8(a);

FIG. 8(c) is a normalized pattern with all fringe slope information across the profile having equal weighting and being proportional to the second wavefront derivative;

FIG. 8(d) is a macroscopic fringe deflectogram for comparison, being a typical deflectogram in which the camera resolves fringes; and FIGS. 9(a)–(c) are air slit deflectograms, apodized slit deflectograms, and the normalized pattern, respectively, for a view orthogonal to that of FIGS. 8(a)–(d).

DESCRIPTION OF THE PREFERRED EMBODIMENTS (Best Modes for Carrying Out the Invention)

The present invention is of a Fourier moiré wavefront sensor that uses moiré deflectometry and the Fourier transforming properties of a lens to optically compute wavefront curvature of incident light. In a moiré deflectogram, the angle of the fringes indicates the magnitude and sense of the wavefront curvature incident on the first grating. In the present invention, two gratings produce moiré deflectograms. A frequency filter is placed in the Fourier plane of the lens, which has a variable transmission profile. When wavefront aberrations induce changes in the moiré deflectogram, they also change the deflectogram's frequency information in a characteristic way at the Fourier plane. The broadening of particular frequency components is such that the angle of the fringes in the deflectogram is encoded as intensity information by the filter, downstream, in the image plane. Hence, wavefront curvature is encoded directly as intensity information. Optimally, 50% transmission corresponds to the unaberrated case, 100% transmission corresponds to maximal curvature of the wavefront in one direction, and 0% transmission corresponds to maximal curvature of the wavefront in the other. This image plane is then imaged onto a detector array that can be directly connected with conventional electronics to an analog (preferably) interpreter, and then to adaptive optic elements.

The present invention is particularly well suited for fast wavefront detection and correction of single ultrashort optical pulses. Based on moiré deflectometry, the magnitude and sense of wavefront curvature (directional $2^{nd}$ derivative) is directly obtained as an image. Single-shot fringe processing takes place at the Fourier plane of an imaging lens with an apodized slit as the transmission filter.

Figure 1:
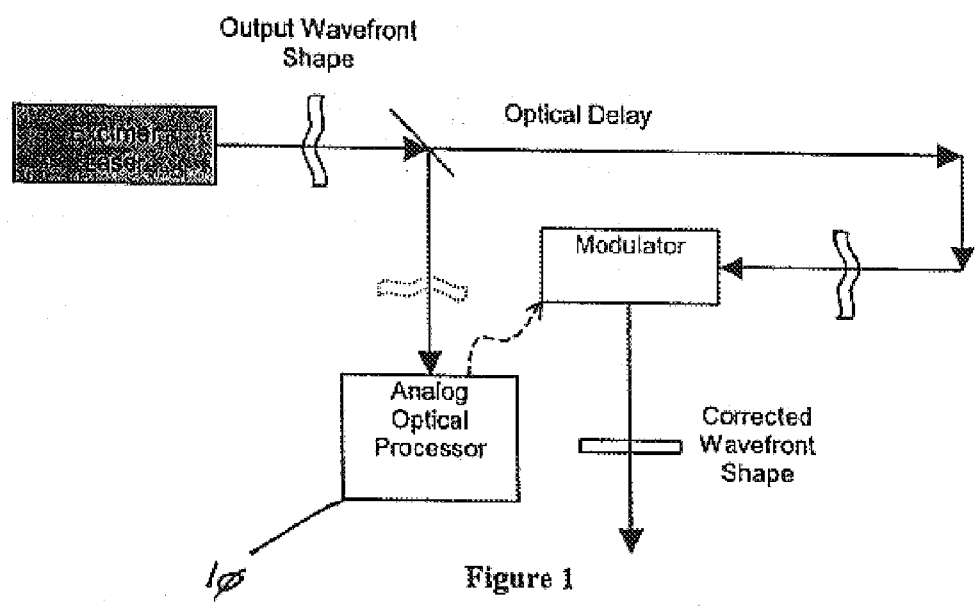
FIG. 1 is a schematic showing use of the invention in an application relying on consistent propagation of excimer laser ultrashort pulses in gaseous media.

The temporal characteristics of ultra-short pulses in the far field critically depend on wavefront properties. Several applications rely on consistent propagation of ultrashort pulses in gaseous media and, in order to control this, the diagnosis and control of the wavefront is necessary. The amplification of ultrashort pulses, as in excimer lasers, for example, is a particularly important application. The present invention provides a fast, broadband and practical wavefront sensor for use in a wavefront correction that can operate on a shot-to-shot basis. This requires a nanosecond detection and response scheme. The fact that ultrashort pulses are used requires giving the beam to be corrected a delay equal to the response time of the correcting loop (FIG. 1), requiring that the wavefront detection occurs with the pulse already in the spatio-temporal far-field. The present invention, based on moiré deflectometry, provides a practical, inexpensive alternative, while avoiding complex and time-consuming data manipulation to retrieve quantitative wavefront information. The use of short pulses puts another constraint on the wavefront sensor it cannot be a type of interferometer that is sensitive to differences between group and phase velocities.

Figure 2:
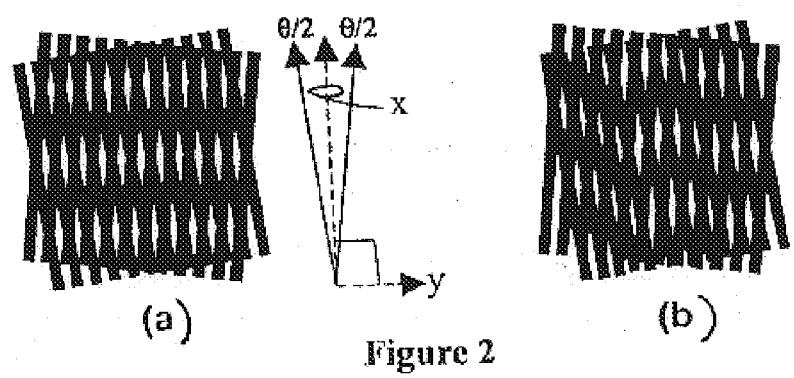
FIGS. 2(a) and (b) illustrate illustrates the use of overlapping gratings to generate moiré fringes.

The typical moiré deflectometry setup uses two linear, ruled, gratings of opaque lines. The gratings are normal to any incoming beam of light, and are separated by a distance, d. If one looks through these gratings so that their lines overlap, and sets them at a relative angle, e, spatial interference becomes apparent, demonstrating "moiré fringes" which are perpendicular to the angle bisector, as seen in FIG. 2(a). Adjacent grating line intersections are characterized by two distances, one relatively long along the x-axis, and the shorter along the y-axis. It is seen that the fringes run along the y-axis. FIG. 2(b) shows how small perturbations imposed on the line spacing of one grating produce large distortions in the moiré fringe direction. In practice, a non-planar wavefront hits the first grating, G1 so that after propagation over the distance d between the gratings, the superposition with G2 produces distorted fringes. Moire deflectometry is the analysis of the resulting (deformed) fringes, with the purpose of reconstructing the wavefront, and is described generally in O. Kafri, et al., *The Physics of Moire Metrology*, John Wiley & Sons, New York (1990).

For small angle θ, the fringe direction is roughly perpendicular to both sets of grating lines. Hence, the deflectometer is not sensitive to wavefront changes in the x-axis direction, but only in the y-direction. Consider a wavefront shape, U(x,y). Using the paraxial approximation for θ as well as for light propagation, the deviation of a grating line is $$\delta y_{line} \cong \frac{\partial U(x, y)}{\partial y} \cdot d,$$

so that line deviation depends on wavefront tilt. A particular line-intersection (defining the local fringe position) will translate along x according to $$\delta x_{fringe} \cong \frac{\delta y_{line}}{\theta},$$

H. J. Canabal, A. Quiroga, and E. Bemabeu, "Automatic processing in moiré deflectometry by local fringe direction calculation," *Applied Optics*, 37, pp. 58945901 (1998), which is the line deviation magnified by the inverse of the angle. Local fringe excursion relates, then, to the wavefront by $$\delta x_{fringe} \cong \frac{\partial U(x, y)}{\partial y} \cdot \frac{d}{\theta}$$

Figure 3:
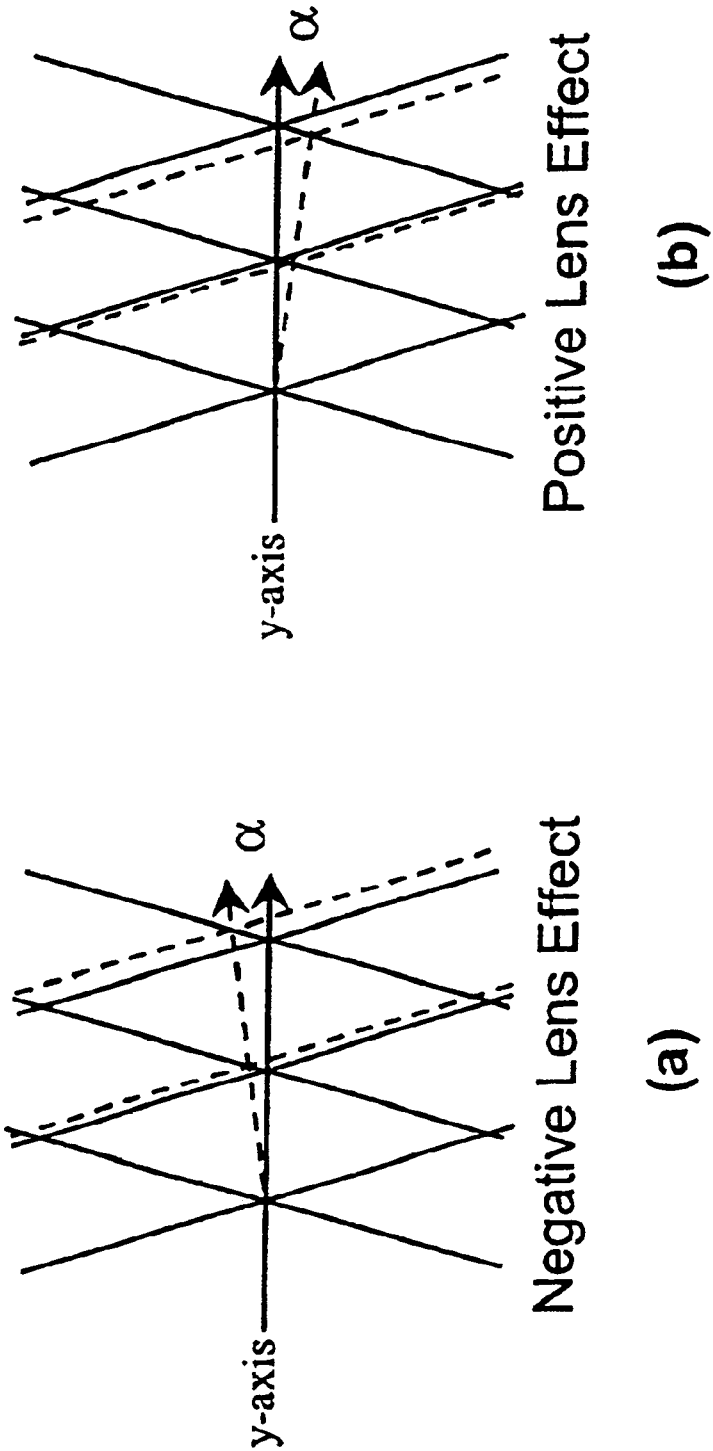
FIGS. 3(a) and (b) illustrate negative and positive lens effects on fringe spacings.

For a plane-wave with tilt, all the line-intersections (and hence fringes) will translate by this amount but there will be no change in the fringe orientation. To produce a change in fringe orientation, there must be a curvature to the wavefront. Consider, for example, an expanded view of a few grating lines from each grating, overlapped as in FIGS. 3(a) and (b). For a planar wave incident, the lines running diagonally down and to the right do not move. The solid arrow indicates this undeviated fringe orientation. However, a wavefront incident on the deflectometer, which has passed through a lens, causes the spacing of the lines to change after propagation of a distance d. For a negative lens, the lines of G1 separate, and for a positive lens, they approach each other (for d less than the focal length), as the dashed lines in FIGS. 3(a) and (b) indicate. New fringes (dashed arrows) produced with distorted G1 therefore indicate the sense of curvature by a positive or negative change in angle, α. The magnitude of the curvature is measured by the magnitude of α. The ability to gain both magnitude and sense of wavefront curvature in one "exposure" is an advantage over Schlieren techniques, for example, which only indicate magnitude. It is also an advantage over interferometric techniques, which require phase-shifting and heavy computation to determine the wavefront shape.

The fringe angle is related to the curvature of the wavefront by $$\tan(\alpha) = \frac{\partial (\delta x_{fringe})}{\partial y} \cong \frac{\partial^2 U(x, y)}{\partial y^2} \cdot \frac{d}{\theta}$$

Figure 4:
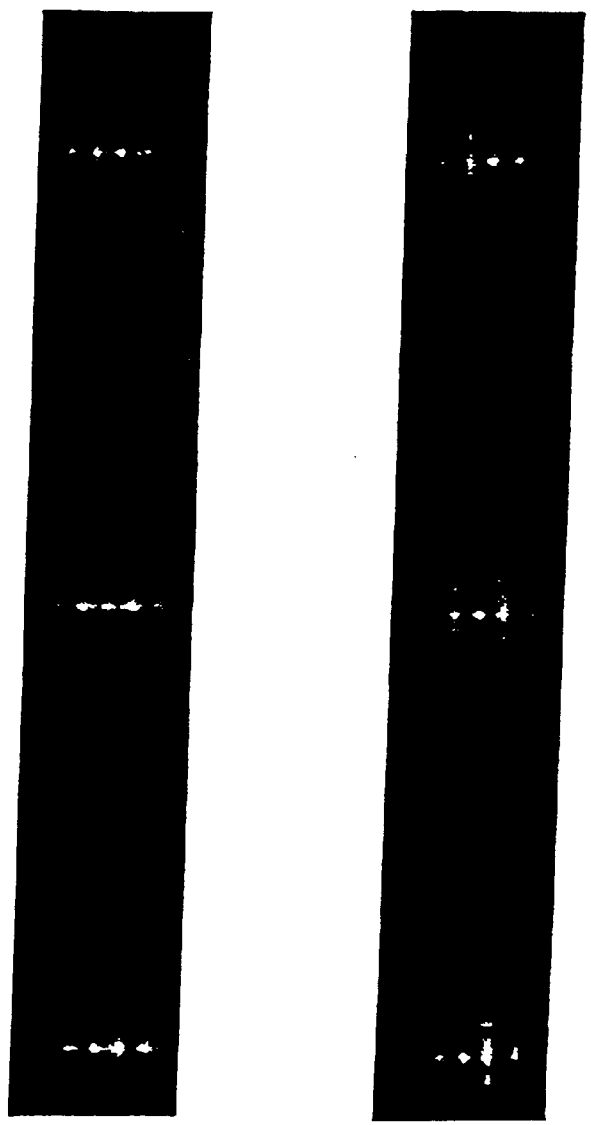
FIGS. 4(a) and (b) illustrate two example moiré patterns and portions of their calculated Fourier transformations.

To appreciate some of the detailed characteristics of the fringes, FIG. 4 shows two example moiré patterns and part of their calculated Fourier transformations. Shown in FIG. 4(a) is the superposition of two idealized gratings. The corresponding diffraction pattern shows high spatial frequency components along the horizontal dimension generated by the gratings themselves. The closer spaced, lower frequency features in the vertical direction can be considered to derive from the moiré pattern. In FIG. 4(b), fringes sloping away from the previously defined y-axis introduce higher spatial frequencies in that direction. However, it is not obvious why spatial frequency components are not produced along the x-axis. Two counteracting effects must be considered. First, as adjacent fringes slope away from the y-axis, the pitch decreases between them. Second, this pitch change, projected onto the x-axis, does not change. This useful property of the Fourier components is found for deflectograms created with high-density gratings at small relative angle, θ.

The present invention uses this behavior of the moiré pattern in the Fourier plane to determine fringe-angle change. Fringes with particular angles contribute to specific spatial frequencies in the Fourier plane. A variable-transmission filter at the Fourier plane, then, can encode intensity information to fringes, as a function of fringe-angle, α. Beyond the Fourier (focal) plane, the image of the deflectogram is changed, depending on what angle the fringes had.

Figure 5:
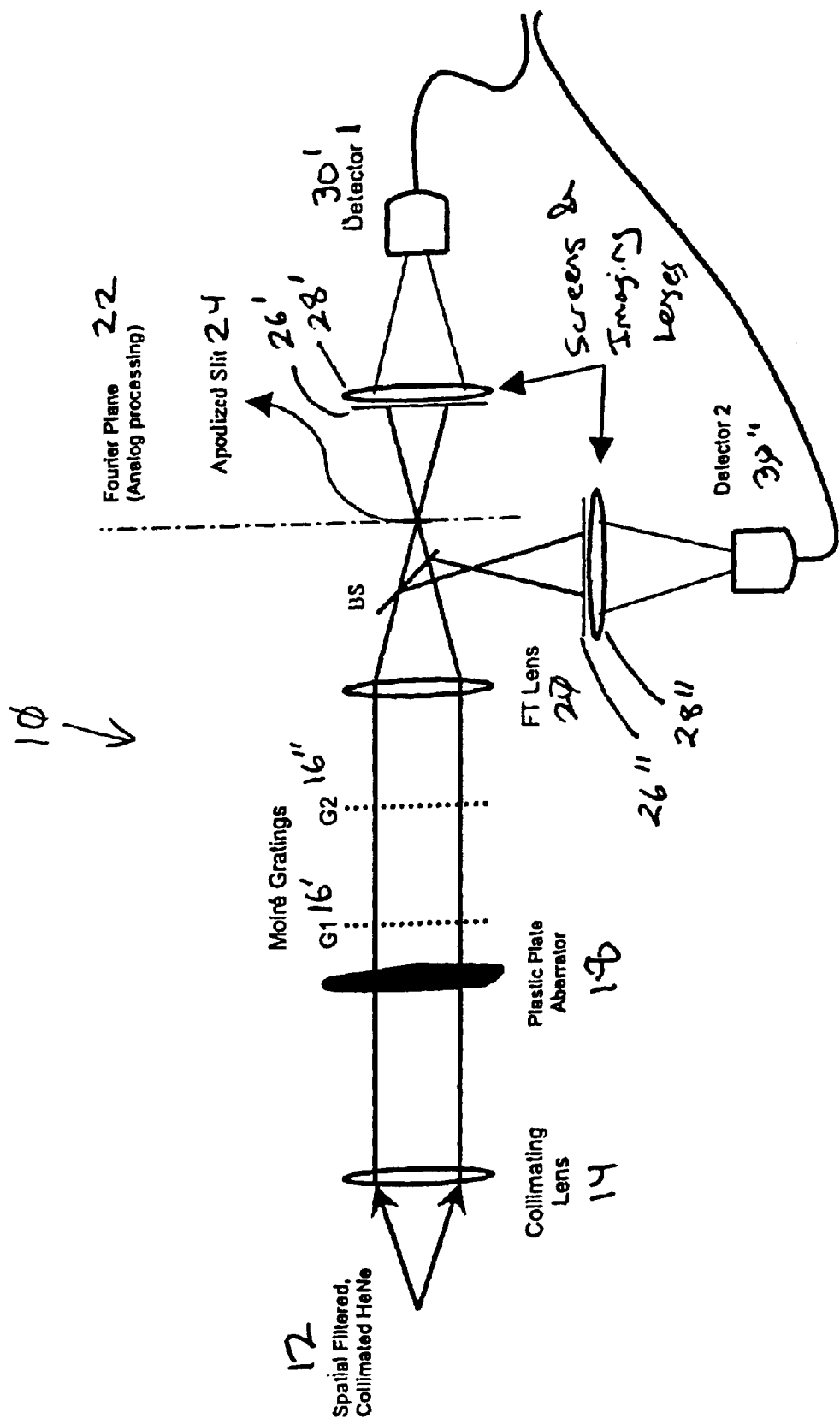
FIG. 5 illustrates an apparatus according to the invention.

As shown in FIG. 5, the apparatus of the present invention 10 may usefully employ an HeNe beam 12 and one-dimensional moiré gratings 16',16" (preferably two, but more may be employed). The laser beam is preferably spatially filtered and collimated and passed through collimating lens 14. The gratings are preferably made of fused silica with opaque rulings at 20 lines/mm and are placed in the beam, with G1 16' just after a clear plastic-sheet aberrator 18 (used for testing). A spherical lens 20 produces the Fourier transform of the pattern at its focal plane 22 and images the G2 16" plane at translucent screens 26',26". Lenses 28',28" are used to image the pattern onto the CCDs or other detectors 30',30".

For purposes of the specification and claims, "moiré gratings" is defined to include any grating which is capable of producing moiré fringes or patterns, including gratings with variable spacing as well as square gratings (lines running in both directions). The moiré gratings of the invention are preferably adjusted to yield no loops or branch-points in the moiré -deflectogram, removing ambiguities that these present. In a typical moiré deflectometry setup, this means that a computer will have a hard time resolving the fringes and determining how they are deviated because in this case they are very close-together and fairly straight. Using the optical Fourier technique of the present invention, however, allows these fringe deviations (by filtering in the Fourier plane) to be sensitive even to these fringes.

Figure 6:
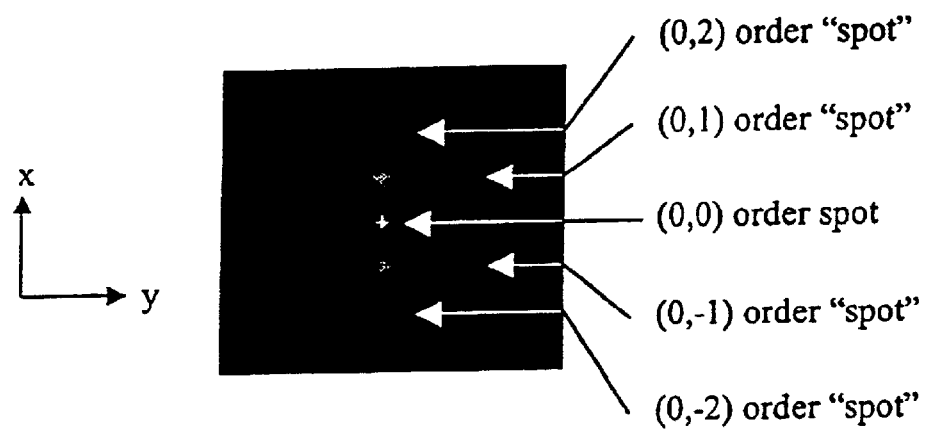
FIG. 6 illustrates the preferred triangular transmission function of the apodized slit of the invention.
Figure 7:
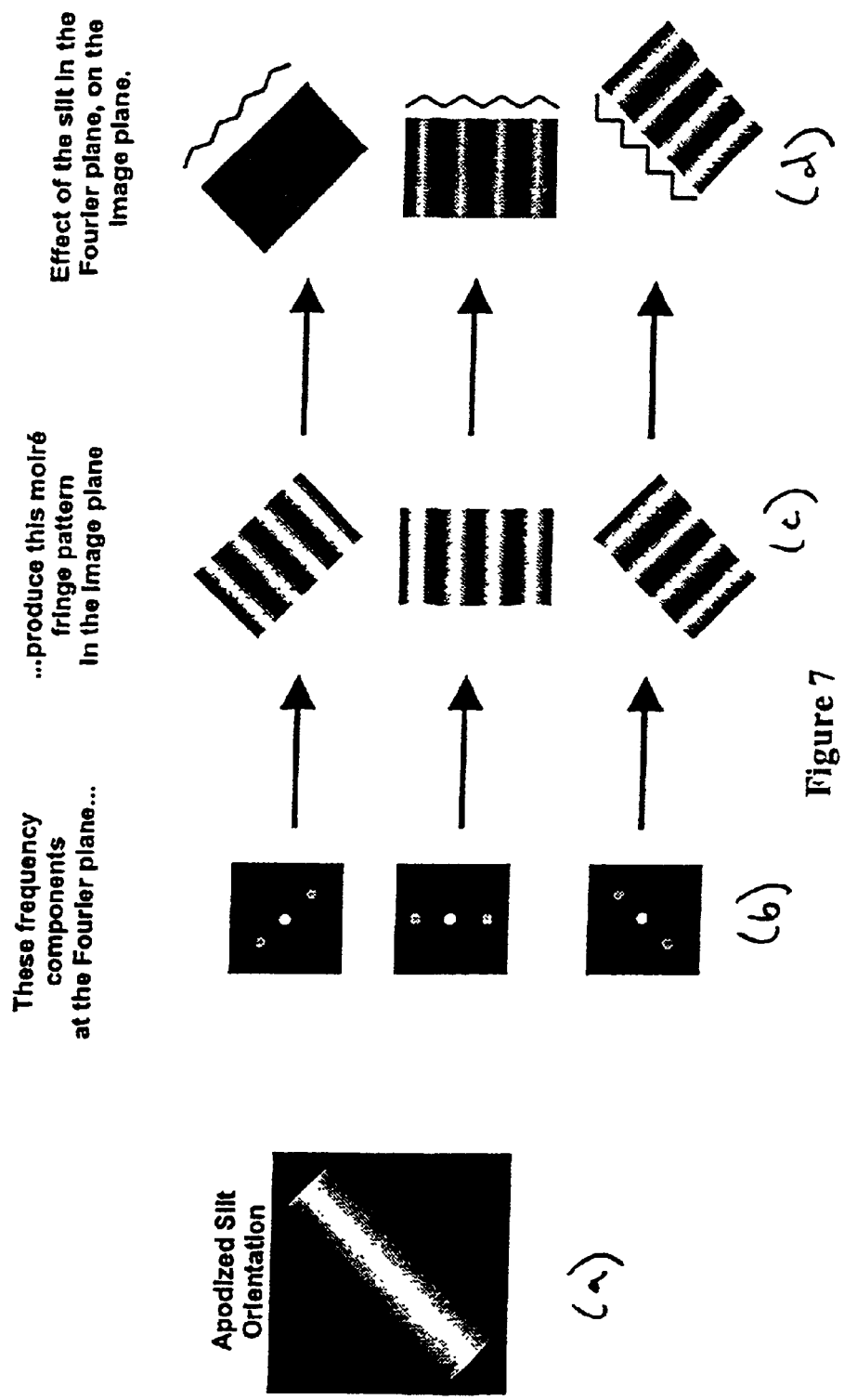
FIG. 7(a) illustrates the preferred apodized slit orientation.
FIG. 7(b) illustrates frequency components at the Fourier plane.
FIG. 7(c) illustrates the moiré fringe patterns produced in the image plane by the frequency components of FIG. 7(b)
FIG. 7(d) illustrates the effect of the slit of FIG. 7(a) in the Fourier plane upon the image plane generated from the frequency components of FIG. 7(b)

The slit 24 is preferably apodized to have a triangular transmission function, and is preferably centered on the (0,0)

spot (using the notation found in FIG. 6) and oriented at 45 degrees to the y-axis. The apodized slit serves two important functions. First, it limits the spatial frequencies to the range covered in FIG. 6. That is, it filters out non-zero orders of the grating diffraction pattern that would otherwise interfere at the image plane of lens 20. The (0,n) orders of the moiré diffraction pattern contain the information of the moiré deflectogram. The second important function of the slit is to attenuate the moiré frequency components according to their angle about the (0,0) order spot. The preferred slit orientation was chosen to determine the angle information of the moiré pattern unambiguously. FIGS. 7(a)–(d) bring this into focus and show how the local fringe slope is determined for $|\alpha|<45$ degrees. The slit in this configuration attenuates the frequency information according to its transfer function. It is shown that +45 degree sloped fringes are most attenuated (pass through the edges of the filter) while −45 degree sloped fringes are least attenuated (passes through the peak transmission region of the filter). So the filtered moiré deflectogram is, at the image plane, an intensity encoded with fringe angle information. Finally, the filtered moiré pattern imaged to CCD 1 30' is normalized by the unfiltered pattern, at CCD 2 30", to remove intensity features not associated with wavefront shape, such as the intensity profile of the beam and larger ghost fringes resulting from imperfections in the gratings. What is left is an amplitude mapping representing the wavefront curvature (second derivative) at each point in the beam. An example of such a picture is presented in FIGS. 8(a)–(d), which include raw deflectograms at G2, filtered deflectograms, normalized deflectograms, and macroscopic fringe pictures of the same aberrator for comparison purposes. Again, the normalized deflectogram has slope information equally weighted across the profile so that the intensity is proportional to wavefront curvature.

Advantages over other moiré techniques present themselves. Whereas other moiré methods require camera-resolved fringes for computer processing, this technique does not. In fact if two or more fringes are imaged on a single pixel (as occurs here), intensity averaging at each pixel takes place and smooth, ghostly deflectograms are generated. Also, if the imaging lens (FIG. 6) can not resolve the high-frequency information the intensity information is averaged over the image resolution at the screen. Hence deflectogram resolution is limited by the imaging system, not the number of fringes resolvable by the camera. In addition, many moiré techniques require phase-shifting algorithms of multiple exposures or differentiation and convolution procedures conducted by a computer which slows down processing. Here, the potential speed of operation is unsurpassed because it uses a speed-of-light optical computer, namely the Fourier-transforming lens and filter to obtain results immediately. If arrays of detectors are used in place of CCDs, an adaptive optic can be affected with a speed defined by fast detectors and analog circuitry.

As mentioned, moiré deflectometry is not the only method of extracting wavefront distortion. Typical Schlieren methods also give an indication of the magnitude of wavefront deviation but not the sign of the wavefront curvature. As shown, moiré deflectometry does reveal this information. Finally, the sensitivity of this detector is very adjustable, especially when compared to Shack-Hartmann sensors that require expensive lenslet array retrofitting if wavefronts distortions of varying severity are detected.

In order to fully characterize the aberration, another view of this three dimensional object is obtained in the orthogonal direction. This is done by simply rotating the aberrator. FIGS. 9(a)–(c) show the result. The two directions can alternatively be examined simultaneously by using two-dimensional moiré gratings.

Practically, the variables that define the features and sensitivity of the deflectogram are easily at hand. For an optical system producing aberrations which comply with statistical averages, the moiré grating separation and relative angle can be adjusted to work with a particular lens/slit combination in order to deliver maximum dynamic range. Slits can be created from design to finish in one day by digital image transfer to photographic slides using local digital image transfer and processing services. The slit used to produce the data disclosed herein is 0.88 mm across and contains 100 pixels across its profile, which blend to produce a smooth gradient during processing. For application at UV or far IR wavelengths, apodized slits can be produced upon appropriate substrates.

The present invention and moiré interferometry promises to be a convenient tool as a fast wavefront diagnostic. The same pair of transmission gratings can cover a broad range of wavelengths, and can be used for ultrashort pulses. Analog filtering of the interferogram, performed in the Fourier plane, leads to a representation of the local power of the wavefront, which can be used to directly drive a wavefront correcting instrument (phase modulator or deformable mirror).

Useful applications of the present invention include the following:

I. Real-time, computer-free analysis of moiré fringes, which encapsulates many applications that use moiré deflectometry as a primary diagnostic, such as:
   a. Imaging under turbid conditions, as in astronomy or reconnaissance.
   b. Non-invasive small-tissue imaging, such as imaging of the ear.
   c. Wind tunnel data or shock-wave analysis, including fast quantitative analysis of the magnitude and sense of wavefront distortion due lo density variations of the atmosphere.
   d. Three-dimensional determination of surroundings for computer vision and obstacle avoidance, including artificial human vision, automobile navigation, and manufacturing applications (such as flat-panel displays).
   e. Studies of atmospheric turbulence with fine temporal resolution.
   f. Other objects with spatial frequency characteristics similar to deflectograms can be instantly analyzed, such as wood grain (for the purpose of lumber inspection), fabric folds, cloud pattern analysis, flow indicator flags in wind-tunnels, laminar flow smoke patterns, chaotic fluid studies, and fractal characterization and recognition.

II. Adaptive optics, including:
   a. Atmospheric turbulence detection for the purpose of laser beam correction. This is particularly attractive for wireless communication or rapid transport of energy. Advantages include high bandwidth in transmission and speed.
   b. Resolution of astronomical or distant terrestrial objects can be achieved by adaptive optical elements such as bimorph mirrors affected using information obtained from the invention.

Ill. Fringe analysis can provide instant three-dimensional information on objects using moiré shadow tomographic techniques (as opposed to deflectometry techniques), including for:
   a. Stress and strain analysis of reasonably flat objects such as semiconductors.
   b. Instant facial recognition by computer.
   c. Corneal shape determination with a hand-held instrument.

d. Instant structural analysis.

e. Instant alignment procedures for such common objects as telescopes and motor vehicle wheels.

IV. Time-resolved experiments with ultra-short pulses. Moiré deflectometry can be performed with either amplitude or phase gratings, Ultra-short pulses can produce phase-gratings which last on the order of femtoseconds and in that way take a time-resolved deflectrogram of interactions occurring on that timescale.

V. Measuring ultra-short optical pulses using the wavefront properties after incidence upon a grating.

VI. Remote sensing of temperature variations in crystals, monitoring of crystal growth, stress testing, and all other applications to which moiré deflectometry has previously been applied.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A wavefront sensor comprising:
   two moiré gratings in an optical path;
   means for optically Fourier transforming a moiré deflectogram produced by said gratings;
   a variably transmitting optical means following said transform means in said optical path; and
   a detector receiving an image through said optical means.

2. The sensor of claim 1 wherein said optical means comprises a transmission filter.

3. The sensor of claim 2 wherein said transmission filter comprises a transmissive optic encoding intensity information upon said moiré deflectogram as a function of fringe angle.

4. The sensor of claim 1 wherein said optical means generates a triangular transmission function.

5. The sensor of claim 4 wherein said optical means generates a triangular transmission function centered on a (0,0) order spatial frequency spot.

6. The sensor of claim 5 wherein said optical means generates a triangular transmission function oriented at 45 degrees to a y-axis.

7. The sensor of claim 4 wherein said optical means generates a triangular transmission function oriented at 45 degrees to a y-axis.

8. The sensor of claim 1 wherein said optical means generates a transmission function centered on a (0,0) order spatial frequency spot.

9. The sensor of claim 8 wherein said optical means generates a transmission function oriented at 45 degrees to a y-axis.

10. The sensor of claim 1 wherein said optical means generates a transmission function oriented at 45 degrees to a y-axis.

11. The sensor of claim 1 wherein said transform means comprises a lens.

12. The sensor of claim 1 wherein said optical means comprises an apodized slit.

13. A Fourier moiré generating apparatus for wavefront sensing, said apparatus comprising:
   two moiré gratings in an optical path;
   optical Fourier transform means following said gratings in said optical path; and
   an apodized optical means following said transform means in said optical path.

14. The apparatus of claim 13 wherein said apodized optical means comprises an apodized slit.

15. The apparatus of claim 13 wherein said apodized optical means encodes intensity information upon said moiré deflectogram as a function of fringe angle.

16. The apparatus of claim 13 wherein said optical Fourier transform means comprises a lens.

17. A method for wavefront sensing, the method comprising the steps of:
   employing two moiré gratings in an optical path;
   optically Fourier transforming a moiré deflectogram produced by the gratings;
   variably transmitting the transformed moiré deflectogram; and
   receiving an image of the variably transmitted and transformed moiré deflectogram.

18. The method of claim 17 wherein variably transmitting comprises employing a transmission filter.

19. The method of claim 18 wherein employing a transmission filter comprises employing a transmissive optic encoding intensity information upon the moiré deflectogram as a function of fringe angle.

20. The method of claim 17 wherein variably transmitting comprises employing an optical means generating a triangular transmission function.

21. The method of claim 20 wherein employing an optical means comprises employing an optical means generating a triangular transmission function centered on a (0,0) order spatial frequency spot.

22. The method of claim 21 wherein employing an optical means comprises employing an optical means generating a triangular transmission function oriented at 45 degrees to a y-axis.

23. The method of claim 20 wherein employing an optical means comprises employing an optical means generating a triangular transmission function oriented at 45 degrees to a y-axis.

24. The method of claim 17 wherein employing an optical means comprises employing an optical means generating a transmission function centered on a (0,0) order spatial frequency spot.

25. The method of claim 24 wherein employing an optical means comprises employing an optical means generating a transmission function oriented at 45 degrees to a y-axis.

26. The method of claim 17 wherein employing an optical means comprises employing an optical means generating a transmission function oriented at 45 degrees to a y-axis.

27. The method of claim 17 wherein optically Fourier transforming comprises employing a lens.

28. The method of claim 17 wherein variably transmitting comprises employing an apodized slit.

29. A Fourier moiré generating method for wavefront sensing, the method comprising the steps of:
   employing two moiré gratings in an optical path;
   employing an optical Fourier transform means following the gratings in the optical path; and
   employing an apodized optical means following the transform means in the optical path.

30. The method of claim 29 wherein employing an apodized optical means comprises employing an apodized slit.

31. The method of claim 29 wherein employing an apodized optical means comprises employing apodized optical means encoding intensity information upon the moiré deflectogram as a function of fringe angle.

32. The method of claim 29 wherein employing an optical Fourier transform means comprises employing a lens.

* * * * *